US007921013B1

(12) United States Patent
Ostermann et al.

(10) Patent No.: US 7,921,013 B1
(45) Date of Patent: *Apr. 5, 2011

(54) SYSTEM AND METHOD FOR SENDING MULTI-MEDIA MESSAGES USING EMOTICONS

(75) Inventors: Joern Ostermann, Morganville, NJ (US); Mehmet Reha Civanlar, Middletown, NJ (US); Eric Cosatto, Highlands, NJ (US); Hans Peter Graf, Lincroft, NJ (US); Yann Andre LeCun, Lincroft, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1147 days.

This patent is subject to a terminal disclaimer.

(21) Appl. No.: 11/214,666

(22) Filed: Aug. 30, 2005

Related U.S. Application Data

(63) Continuation of application No. 10/003,350, filed on Nov. 2, 2001, now Pat. No. 6,990,452.

(60) Provisional application No. 60/245,521, filed on Nov. 3, 2000.

(51) Int. Cl.
*G10L 13/00* (2006.01)
*G10L 13/06* (2006.01)
*G10L 21/00* (2006.01)

(52) U.S. Cl. ........ 704/260; 704/258; 704/267; 704/270; 704/270.1; 704/275

(58) Field of Classification Search .................. 704/235, 704/260, 270, 270.1, 275, 258, 267; 345/473
See application file for complete search history.

(56) References Cited

U.S. PATENT DOCUMENTS

| 4,276,570 A | 6/1981 | Burson et al. |
| 4,602,280 A | 7/1986 | Maloomian |
| 5,113,493 A | 5/1992 | Crosby |
| 5,347,306 A | 9/1994 | Nitta |
| 5,387,178 A | 2/1995 | Moses |
| 5,416,899 A | 5/1995 | Poggio et al. |

(Continued)

FOREIGN PATENT DOCUMENTS

EP 849691 A2 6/1998

(Continued)

OTHER PUBLICATIONS

Ruthkrantz and Wojdel, "A Text Based Talking Face," Lecture Notes in Computer Science, vol. 1902, Jan. 2000, pp. 327-332.*

(Continued)

*Primary Examiner* — James S Wozniak
*Assistant Examiner* — Edgar Guerra-Erazo

(57) ABSTRACT

A system and method of providing sender-customization of multi-media messages through the use of emoticons is disclosed. The sender inserts the emoticons into a text message. As an animated face audibly delivers the text, emoticons associated with the message are started a predetermined period of time or number of words prior to the position of the emoticon in the message text and completed a predetermined length of time or number of words following the location of the emoticon. The sender may insert emoticons through the use of emoticon buttons that are icons available for choosing. Upon sender selections of an emoticon, an icon representing the emoticon is inserted into the text at the position of the cursor. Once an emoticon is chosen, the sender may also choose the amplitude for the emoticon and increased or decreased amplitude will be displayed in the icon inserted into the message text.

16 Claims, 6 Drawing Sheets

U.S. PATENT DOCUMENTS

| | | | |
|---|---|---|---|
| 5,420,801 | A | 5/1995 | Dockter et al. |
| 5,537,662 | A | 7/1996 | Sato et al. |
| 5,546,500 | A | 8/1996 | Lyberg |
| 5,555,343 | A | 9/1996 | Luther |
| 5,613,056 | A | 3/1997 | Gasper et al. |
| 5,630,017 | A | 5/1997 | Gasper et al. |
| 5,638,502 | A | 6/1997 | Murata |
| 5,640,590 | A | 6/1997 | Luther |
| 5,657,426 | A | 8/1997 | Waters et al. |
| 5,659,692 | A | 8/1997 | Poggio et al. |
| 5,680,481 | A | 10/1997 | Prasad et al. |
| 5,689,618 | A | 11/1997 | Gasper et al. |
| 5,697,789 | A | 12/1997 | Sameth et al. |
| 5,745,360 | A | 4/1998 | Leone et al. |
| 5,818,461 | A | 10/1998 | Rouet et al. |
| 5,826,234 | A | 10/1998 | Lyberg |
| 5,832,115 | A | 11/1998 | Rosenberg |
| 5,848,396 | A | 12/1998 | Gerace |
| 5,850,463 | A | 12/1998 | Horii |
| 5,852,669 | A | 12/1998 | Eleftheriadis et al. |
| 5,857,099 | A * | 1/1999 | Mitchell et al. ............... 704/235 |
| 5,880,731 | A | 3/1999 | Liles et al. |
| 5,889,892 | A | 3/1999 | Saito |
| 5,933,151 | A | 8/1999 | Jayant et al. |
| 5,936,628 | A | 8/1999 | Kitamura et al. |
| 5,950,163 | A | 9/1999 | Matsumoto |
| 5,969,721 | A | 10/1999 | Chen et al. |
| 5,970,173 | A | 10/1999 | Lee et al. |
| 5,970,453 | A | 10/1999 | Sharman |
| 5,982,853 | A | 11/1999 | Liebermann |
| 5,983,190 | A | 11/1999 | Trower et al. |
| 5,995,639 | A | 11/1999 | Kado et al. |
| 6,002,997 | A | 12/1999 | Tou |
| 6,011,537 | A | 1/2000 | Slotznick |
| 6,014,634 | A | 1/2000 | Scroggie et al. |
| 6,014,689 | A | 1/2000 | Budge et al. |
| 6,018,744 | A | 1/2000 | Mamiya et al. |
| 6,018,774 | A | 1/2000 | Mayle et al. |
| 6,044,248 | A * | 3/2000 | Mochizuki et al. .......... 340/7.47 |
| 6,068,183 | A | 5/2000 | Freeman et al. |
| 6,069,622 | A | 5/2000 | Kurlander |
| 6,075,857 | A | 6/2000 | Doss et al. |
| 6,075,905 | A | 6/2000 | Herman et al. |
| 6,078,700 | A | 6/2000 | Sarachik |
| 6,088,040 | A | 7/2000 | Oda et al. |
| 6,111,590 | A | 8/2000 | Boezeman et al. |
| 6,122,606 | A | 9/2000 | Johnson |
| 6,147,692 | A | 11/2000 | Shaw et al. |
| 6,166,744 | A | 12/2000 | Jaszlics et al. |
| 6,208,359 | B1 | 3/2001 | Yamamoto |
| 6,215,505 | B1 | 4/2001 | Minami et al. |
| 6,219,638 | B1 | 4/2001 | Padmanabhan et al. |
| 6,225,978 | B1 | 5/2001 | McNeil |
| 6,230,111 | B1 | 5/2001 | Mizokawa |
| 6,243,681 | B1 | 6/2001 | Guji et al. |
| 6,289,085 | B1 | 9/2001 | Miyashita et al. |
| 6,307,567 | B1 | 10/2001 | Cohen-Or |
| 6,324,511 | B1 * | 11/2001 | Kiraly et al. ................... 704/260 |
| 6,329,994 | B1 | 12/2001 | Gever et al. |
| 6,332,038 | B1 | 12/2001 | Funayama et al. |
| 6,343,141 | B1 | 1/2002 | Okada et al. |
| 6,366,286 | B1 | 4/2002 | Hermanson |
| 6,366,949 | B1 | 4/2002 | Hubert |
| 6,377,925 | B1 | 4/2002 | Greene et al. |
| 6,381,346 | B1 | 4/2002 | Erasian |
| 6,384,829 | B1 | 5/2002 | Prevost et al. |
| 6,385,586 | B1 | 5/2002 | Dietz |
| 6,393,107 | B1 | 5/2002 | Ball et al. |
| 6,417,853 | B1 | 7/2002 | Squires et al. |
| 6,433,784 | B1 | 8/2002 | Merrick et al. |
| 6,434,597 | B1 | 8/2002 | Hachiya et al. |
| 6,449,634 | B1 | 9/2002 | Capiel |
| 6,453,294 | B1 * | 9/2002 | Dutta et al. ................. 704/270.1 |
| 6,460,075 | B2 | 10/2002 | Krueger et al. |
| 6,462,742 | B1 | 10/2002 | Rose et al. |
| 6,466,205 | B2 | 10/2002 | Simpson et al. |
| 6,466,213 | B2 | 10/2002 | Bickmore et al. |
| 6,476,815 | B1 | 11/2002 | Ando |
| 6,496,868 | B2 | 12/2002 | Krueger et al. |
| 6,522,333 | B1 | 2/2003 | Hatlelid et al. |
| 6,532,011 | B1 | 3/2003 | Francini et al. |
| 6,535,907 | B1 | 3/2003 | Hachiya et al. |
| 6,539,354 | B1 * | 3/2003 | Sutton et al. .................. 704/260 |
| 6,542,936 | B1 | 4/2003 | Mayle et al. |
| 6,553,341 | B1 | 4/2003 | Mullaly et al. |
| 6,606,096 | B2 | 8/2003 | Wang |
| 6,631,399 | B1 | 10/2003 | Stanczak et al. |
| 6,643,385 | B1 | 11/2003 | Bravomalo |
| 6,654,018 | B1 | 11/2003 | Cosatto et al. |
| 6,661,418 | B1 * | 12/2003 | McMillan et al. ............ 345/473 |
| 6,665,860 | B1 | 12/2003 | DeSantis et al. |
| 6,680,934 | B1 | 1/2004 | Cain |
| 6,766,299 | B1 | 7/2004 | Bellomo et al. |
| 6,782,431 | B1 | 8/2004 | Mukherjee et al. |
| 6,784,901 | B1 | 8/2004 | Harvey et al. |
| 6,801,931 | B1 | 10/2004 | Ramesh et al. |
| 6,833,845 | B2 | 12/2004 | Kitagawa et al. |
| 6,919,892 | B1 | 7/2005 | Cheiky et al. |
| 6,963,839 | B1 | 11/2005 | Ostermann et al. |
| 6,975,988 | B1 * | 12/2005 | Roth et al. .................... 704/260 |
| 6,987,535 | B1 | 1/2006 | Matsugu et al. |
| 6,990,452 | B1 | 1/2006 | Ostermann et al. |
| 7,174,295 | B1 * | 2/2007 | Kivimaki ...................... 704/260 |
| 7,177,811 | B1 | 2/2007 | Ostermann et al. |
| 7,203,648 | B1 | 4/2007 | Ostermann et al. |
| 7,203,759 | B1 | 4/2007 | Ostermann et al. |
| 2001/0019330 | A1 | 9/2001 | Bickmore et al. |
| 2001/0049596 | A1 | 12/2001 | Lavine et al. |
| 2001/0050681 | A1 | 12/2001 | Keys et al. |
| 2001/0050689 | A1 | 12/2001 | Park |
| 2002/0007276 | A1 * | 1/2002 | Rosenblatt et al. ........... 704/260 |
| 2002/0109680 | A1 | 8/2002 | Orbanes et al. |
| 2002/0176604 | A1 | 11/2002 | Shekhar et al. |
| 2002/0194006 | A1 | 12/2002 | Challapali |
| 2003/0028378 | A1 | 2/2003 | August et al. |
| 2003/0035412 | A1 | 2/2003 | Wang et al. |
| 2003/0046160 | A1 | 3/2003 | Paz-Pujalt et al. |
| 2003/0046348 | A1 | 3/2003 | Pinto et al. |
| 2003/0191816 | A1 | 10/2003 | Landress et al. |
| 2004/0018858 | A1 * | 1/2004 | Nelson ......................... 455/566 |
| 2004/0091154 | A1 | 5/2004 | Cote |
| 2005/0091305 | A1 | 4/2005 | Lange et al. |
| 2007/0033259 | A1 | 2/2007 | Wies et al. |

FOREIGN PATENT DOCUMENTS

| | | |
|---|---|---|
| EP | 849692 A2 | 6/1998 |
| EP | 1 111 883 * | 12/1999 |
| JP | 2003033575 A | 2/2003 |
| KR | 2002016482 A | 3/2002 |

OTHER PUBLICATIONS

Cruickshank L.; Hughes B., "Facilitating the Evolution of a User Driven Iconotextual Internet Patois," Digital Creativity, vol. 10, No. 2, Jun. 1999, pp. 79-89(11).*

Chua, C; Neumann, U., "A layered approach to deformable modeling and animation", Proceedings of the Fourteenth Conference on Computer Animation, Nov. 7-8, 2001, pp. 184-191.

Decarlo et al,"An anthropometric face model using variational techniques", In Proc. of 25th Annl Conf. on Computer Graphics & interactive Tech.Siggraph 98, ACM Press, NY,67-74.

Jian-Gang Wang et al."Morphology-based front-view facial contour detection", IEEE Int'l Conf on Systems, Man and Cybernetics, vol. 4, Oct. 2000, pp. 2775-2780.

Shinn-Yin Ho et al,"Facial modeling fr. an uncalibrated face image using flexible generic parameterized facial models", IEEE Trans. on Systems, Man, & Cybernitics, Pt B, V.31,.

Noh, J. et al,"Expression cloning", In Proc.of 28th Annual Conf. on Computer Graphics and interactive Techniques, SIGGRAPH 01, ACM Press, NY, NY p. 277-288.

Litwinowicz, et al "Animating images with drawings" Proc 21st Annual Conf. on Computer Graphics & interactive Tech. SIGGRAPH 1994, ACM Press, NY, NY 409-412.

Yoo, et al "Concept formation in numeric domains" Proc.1995 ACM 23rd Annual Conf. on Computer Science, ACM Press, NY, NY, 36-41.

Naka, T.; et al., "A compression/decompression method for streaming based humanoid animation", Proceedings of Fourth Symposium on Virtual Reality Modeling Language Feb. 23-26, 1999, VRML'99, ACM Press, NY, NY, pp. 63-70.

Perlin, K. et al., "Improv: a system for scripting interactive actors in virtual worlds", Proceedings of the 23$^{rd}$ Annual Conference on Computer Graphics and interactive Techniques, SiGGRAPH '96, ACM Press, NY, NY, pp. 205-216.

Pighin, F., et al., "Synthesizing realistic facial expressions from photographs", Proceedings of the 25$^{th}$ Annual Conference on Computer Graphics and interactive Techniques, SIGGRAPH '96, ACM Press., NY, NY, pp. 75-84.

Marks et al., "Fuzzy and extra crisp alternating projection onto convex sets (POCS)", Proceedings IEEE International Conference on Fuzzy Systems vol. 2, Mar. 20-24, 1995, pp. 427-435 vol. 2.

Zs. Ruttkay, P. ten Hagen, H. Noot. and M. Savenije, Facial animation by synthesis of captured and artificial data, CAPtech '98 proceedings, 1998.

J. Hendrix, et al., "A facial repertoire for avatars", Proceedings of the Workshop "Interacting Agents", Enschede, The Netherlands, 2000, pp. 1-20.

Business Editors, & High-Tech Writers, "Life F/X Inc. Introduces Strategy for Web Success", Business Wire, New York: Feb. 1, 2000. pp. 1-3.

David Kurlander, Tim Skelly, David Salesin. "Comic Chat", Proceedings of the 23$^{rd}$ Annual Conference on Computer Graphics and Interactive Techniques, Aug. 1996.

Pollack, "Happy in the East or Smiling in the West". New York Times. Aug. 12, 1996.

Pelachaud et al., "Generating Facial Expressions for Speech". Cognitive Science. Jan. 3, 1996. vol. 20, No. 1, pp. 1-46.

Edwards, Keith W. "The Design and Implementation of the MONTAGE Multimedia Mail System". Apr. 1991, IEEE Conference Proceedings of TRICOMM '91, pp. 47-57.

Ming Ouhyoung, I-Chen Lin, David S.D. Lee "Web-Enabled Speech Driven Facial Animation". Proc. of ICAT'99 (International Conference on Artificial Reality Tele-existence), pp. 23-28, Conference held on Dec. 16-18, 1999, Tokyo, Japan.

H. Noot. ZS. M. Rutkay, Chartoon 20.0 Manual, Jan. 31, 2000.

Lijun Yin, A. Basu; "MPEG4 face modeling using fiducial points", IEEE; Image Processing, 1997, Proceedings., International Conference on, Volume: Jan. 26-29, 1997.

Bickmore, et al., "Animated Autonomous Personal Representatives", ACM, International Conference on Autonomous Agents. Proceedings of the Second International Conference on Autonomous Agents; pp. 8-15, 1998.

Thorisson, Kristinn R., "ToonFace: A System for Creating and Animating Interactive Cartoon Faces." MIT Media Laboratory Learning and Common Sense Section Technical Report, pp. 96-101, Apr. 1996.

David Kurlander, Tim Skelly., David Salesin, "Comic Chat", Proceedings of the 23rd Annual Conference on Computer Graphics land Interactive Techniques, Aug. 1996.

Pollack, "Happy in the East or Smiling in the West", York Times, Aug. 12, 1996.

Pelachaud, et al. "Generating Facial Expressions for Speech", Cognitive Science, Jan. 3, 1996; vol. 20, No. 1, pp. 1-46.

Joern Ostermann, "Animated Talking Head with Personalized 3d Head Model", 1998, Journal of VLSI Signal Processing 20, pp. 97-105.

Delorie, "Why HTML Mail is Evil", downloaded from the internet, copyright Mar. 1999, pp. 1-7, http:www.delorie.com/listserv/mime.

Bonamico et al., "Virtual Talking Heads for Tele-Education Applications", in Proceedings of SSGRR 2001 int. Conf. on Advances in infrastructure for Electronic Business, Science, and Education on the internet, L'Aquila, Italy, Aug. 2001 pp. 1-8.

Yamada, A., Ohta, M., "Visual text reader for virtual image communication on networks," IEEE First Workshop on Multimedia Signal Processing, 1997, pp. 495-500, Jun. 23-25, 1997.

\* cited by examiner

SYSTEM AND METHOD FOR SENDING MULTI-MEDIA MESSAGES USING EMOTICONS

PRIORITY APPLICATION

The present application is a continuation of U.S. patent application Ser. No. 10/003,350, filed on Nov. 2, 2001 now U.S. Pat. No. 6,990,452, which claims the benefit of provisional claims priority to U.S. Patent Application No. 60/245,521 filed Nov. 3, 2000. The contents of U.S. patent application Ser. No. 10/003,350 and provisional U.S. Patent Application No. 60/245,521 are incorporated by reference herein in their entirety.

RELATED APPLICATIONS

The present application is related to the following U.S. patent applications: Ser. No. 10/003,094 entitled "System and Method for Sending Multi-Media Message With Customized Audio"; Ser. No. 10/003,091 entitled "System and Method for Receiving Multi-Media Messages"; Ser. No. 10/003,093 entitled "System and Method for Sending Multi-Media Messages Using Customizable Background Images"; Ser. No. 10/003,092 entitled "System and Method of Customizing Animated Entities for Use in a Multi-Media Communication Application"; Ser. No. 09/999,526 entitled "System and Method of Controlling Sound in a Multi-Media Communication Application"; Ser. No. 09/555,525 entitled "System and Method of Marketing Using a Multi-Media Communication System"; and Ser. No. 09/999,505 entitled "System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the creation and sending of multi-media messages.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s Facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the multi-media message are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TS function as well as the synchronization of the speech with the talking head. For example, the article, "Photo-realistic Talking-heads From Image Samples," by E. Cosatto and H. P. Graf, *IEEE Transactions on Multimedia*, September 2000, Vol. 2, Issue 3, pages 152-163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today?:-)". These indicators of emotion are called "emoticons" and may include such features as: :-( (frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?"

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received Facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method of making emoticons within multi-media messages more natural for a message recipient to hear and see. Enhanced presentation of emoticons in multi-media messages will increase the user appreciation and interactive experience with the multi-media message. Furthermore, the prior art method of inserting emoticons into text is cumbersome. For example, typing a smile ":-)" requires at least three keystrokes to accomplish. Therefore, another aspect of the present invention relates to improving the ease with which a sender can choose and insert emoticons into the text of a message.

According, the present invention addresses the deficiency of emoticon presentation by starting the visual representation of an emotion a predetermined period of time prior to the location of the emoticon in the text and completes the emotion a predetermined length of time following the insertion of the emoticon. Further, the presentation of an emotion may begin and end a predetermined period of time, number of syllables, or number of words prior to the placement of the emoticon in the sentence by the message sender.

For example, in our above sentence "Hi, Jonathon, :-) how are you today?", the smile may start one second before the smile emoticon and end one second after. The smile may also start before the word "Jonathan" and end after the word "how." In another variation, the smile may begin two syllables before the emoticon on the "a" sound of "Jonathon" and end after "how are." There are many variations on this arrangement and it does not always have to be symmetrical around the emoticon. In other words, it is not necessary that the sound begin "x" number of syllables/words/time before the emoticon and end "x" number of syllables/words/time after the emoticon. Mixing and matching of starting and ending effects are contemplated to maximize the presentation of a natural multi-media message.

Another embodiment of the invention relates to a method of customizing a multi-media message with emoticons, the multi-media message being created by a sender for a recipient wherein the multi-media message comprises an animated entity audibly delivering a text message. The method comprises storing emoticons related to actions associated with the animated entity, providing to a sender at least one button option for choosing emoticons to insert into the text message at a location of a cursor and upon, the sender choosing an emoticon using one of the at least one button options, inserting an emoticon into the text message at the location of the cursor, wherein when the animated entity delivers the text message, the animated entity exhibits the actions associated with the inserted emoticons. In this manner, rather than using at least three keystrokes, an emoticon may be inserted into the text, typically at a point of the cursor, by a single button click. The emoticons may comprise, for example, a wink, a smile, an affirmative animated entity motion, eyes opening and staring, eyes popping out, and nose elongation.

In yet another variation on the availability of buttons to insert emoticons, the method further comprises presenting the sender an amplitude option associated with the chosen emoticon. Upon the sender selecting an amplitude associated with the chosen emoticon, the method comprises applying the chosen amplitude to the chosen emoticon when the multi-media message is presented to the recipient. In this manner, the sender can choose a small smile or a large smile, small frown or large frown, etc.

The amplitude associated with an emoticon may be constant or change over time. A smile emoticon, for example, might create a smile of three phases, similar to a human smile with an onset, a peak and a decay phase.

In the prior art, the text of the message, with the inserted emoticons, appears awkward with the characters representing the emoticons within the text. Accordingly, another aspect of the present invention relates to inserting an icon representing an emoticon into the text message at the location of the cursor. An icon may be a small, simplified face with a representation of the emotion and may further include or display the relative amplitude of the emotion chosen by the sender. For example, an icon may be a small face with a very large smile if the sender has chosen a smile and then increased the amplitude of the smile.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
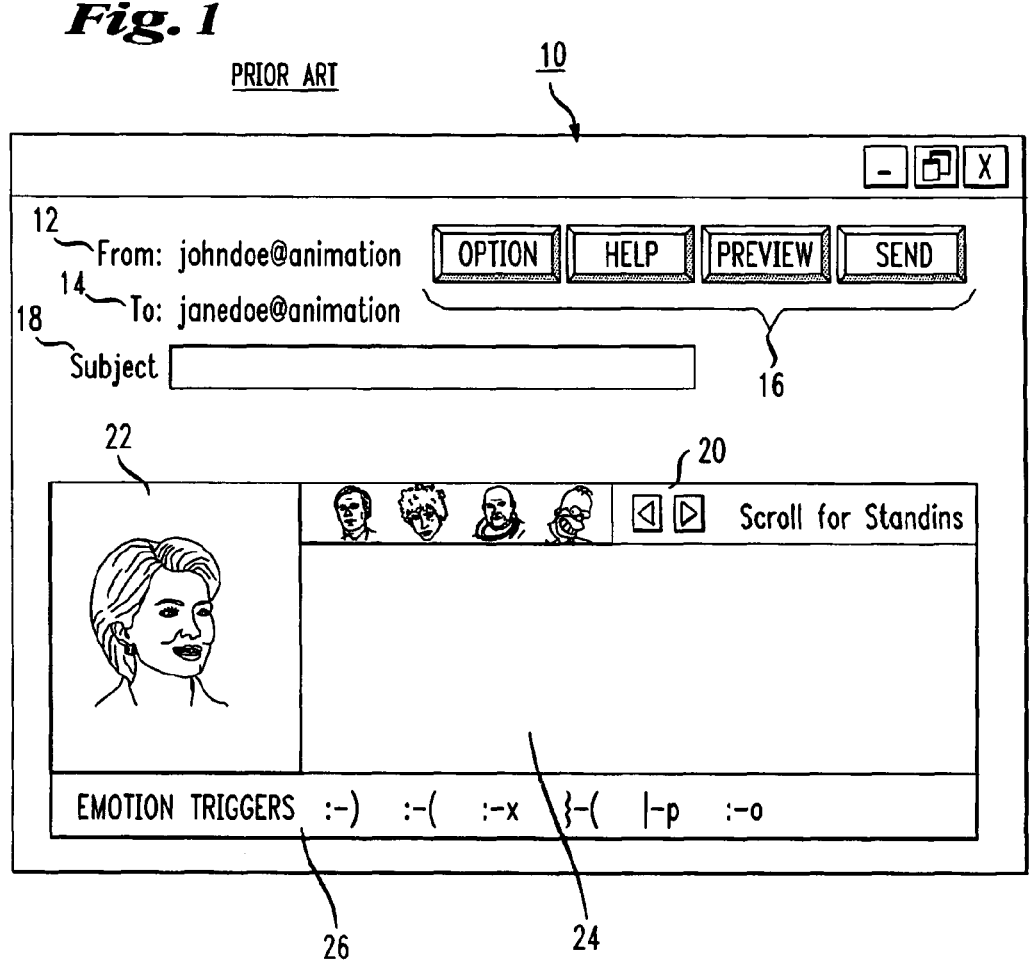
FIG. 1 illustrates a prior art window for creating a multi-media message.
Figure 2:
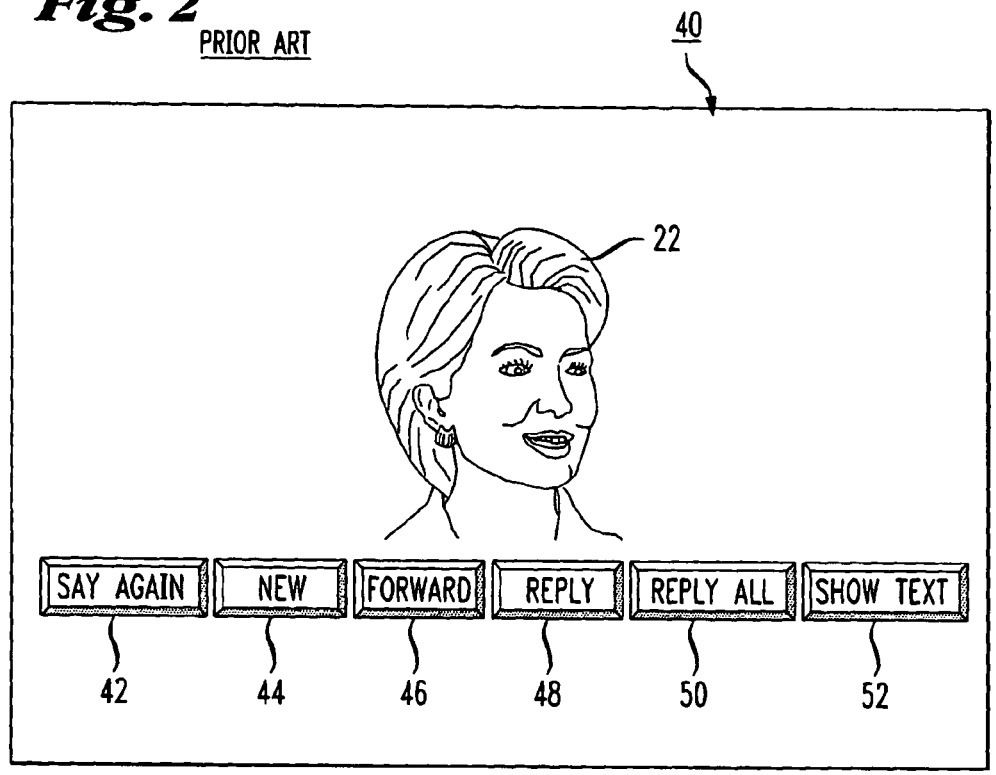
FIG. 2 illustrates a prior art window viewed by a recipient of a multi-media message.
Figure 3:
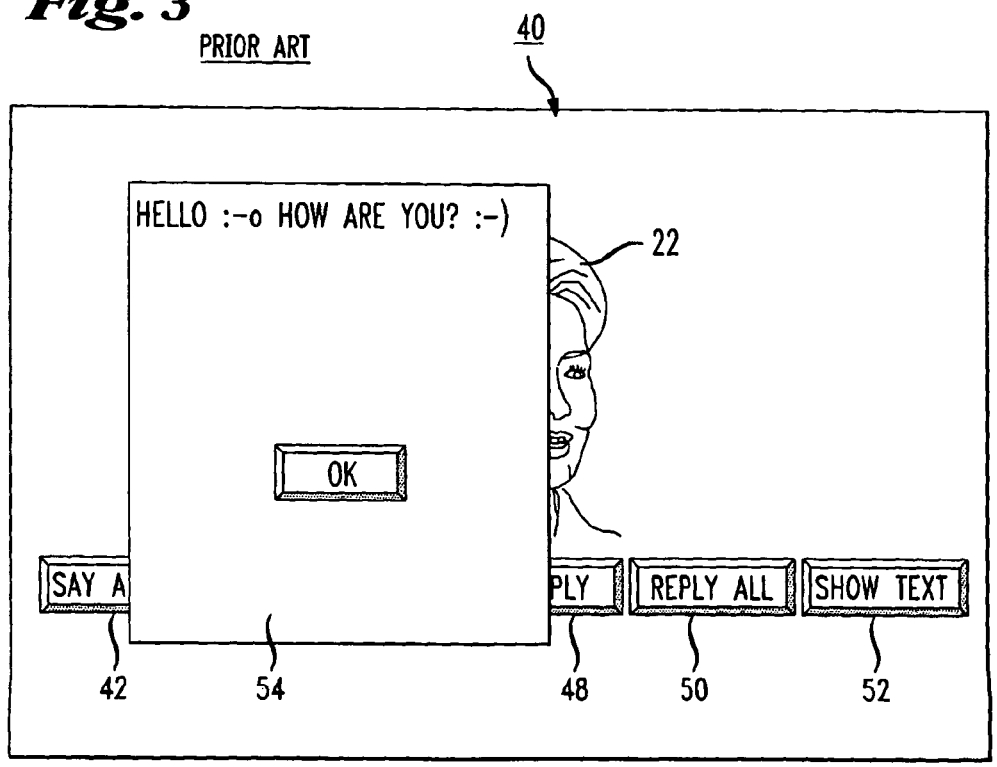
FIG. 3 illustrates a prior art window in response to a recipient of a multi-media message clicking on a "show text" button.
Figure 4A:
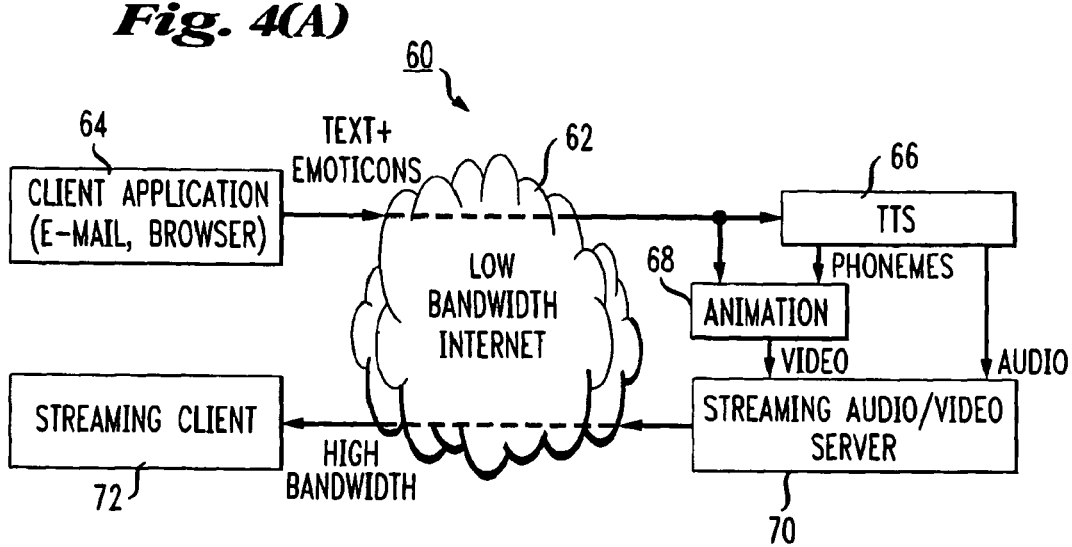
FIG. 4(a) illustrates the basic architecture of the system according to an embodiment of the present invention.

FIG. 4(a) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

Figure 4B:
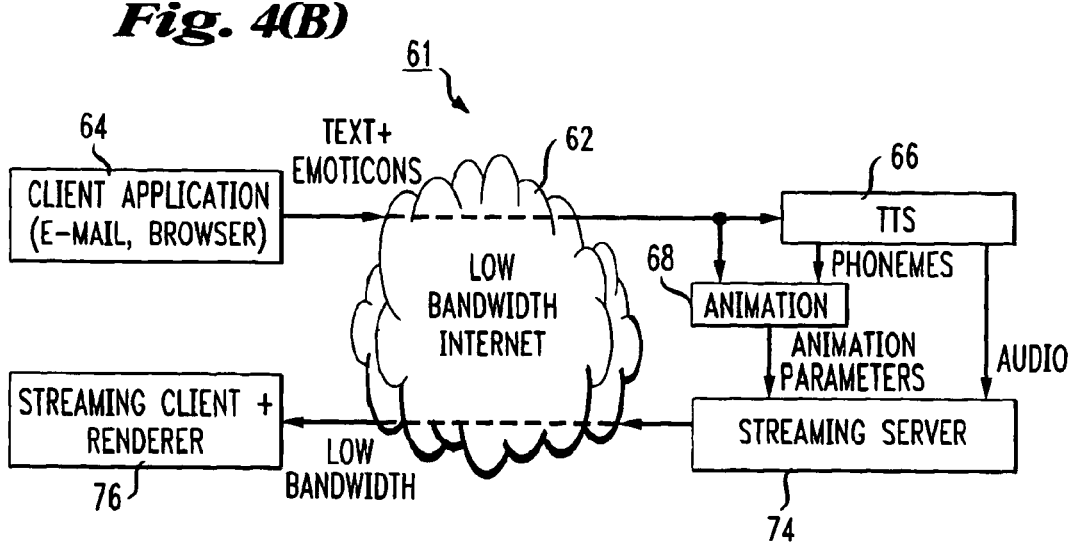
FIG. 4(b) illustrates a low-bandwidth version of the system shown in FIG. 4(a)

The system 60 encodes the audio and video portions of the multi-media message for streaming through a streaming audio/video server 70. In a high-bandwidth version of the present invention, as shown in FIG. 4(*a*), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

FIG. 4(*b*) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(*a*) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(*a*) and 4(*b*) provide both a high-bandwidth and a low-bandwidth option for all users.

A further variation of the invention applies when the client device includes the animation or rendering software. In this case, the client device 72, 76 can receive a multi-media message e-mail, with the message declared as a specific multi-purpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
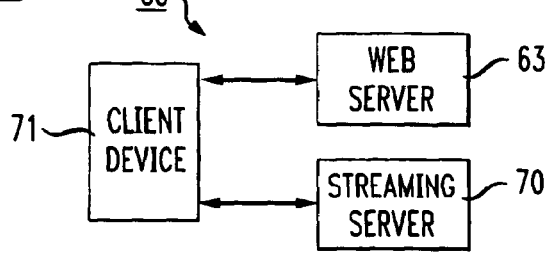
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's Palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than two participants) or unicast (two participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, Trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned these problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft Mediaplayer® or Real Player®. If the user so desires, he or she can then download the rendering software for enjoying the reception of multi-media messages.

Figure 6:
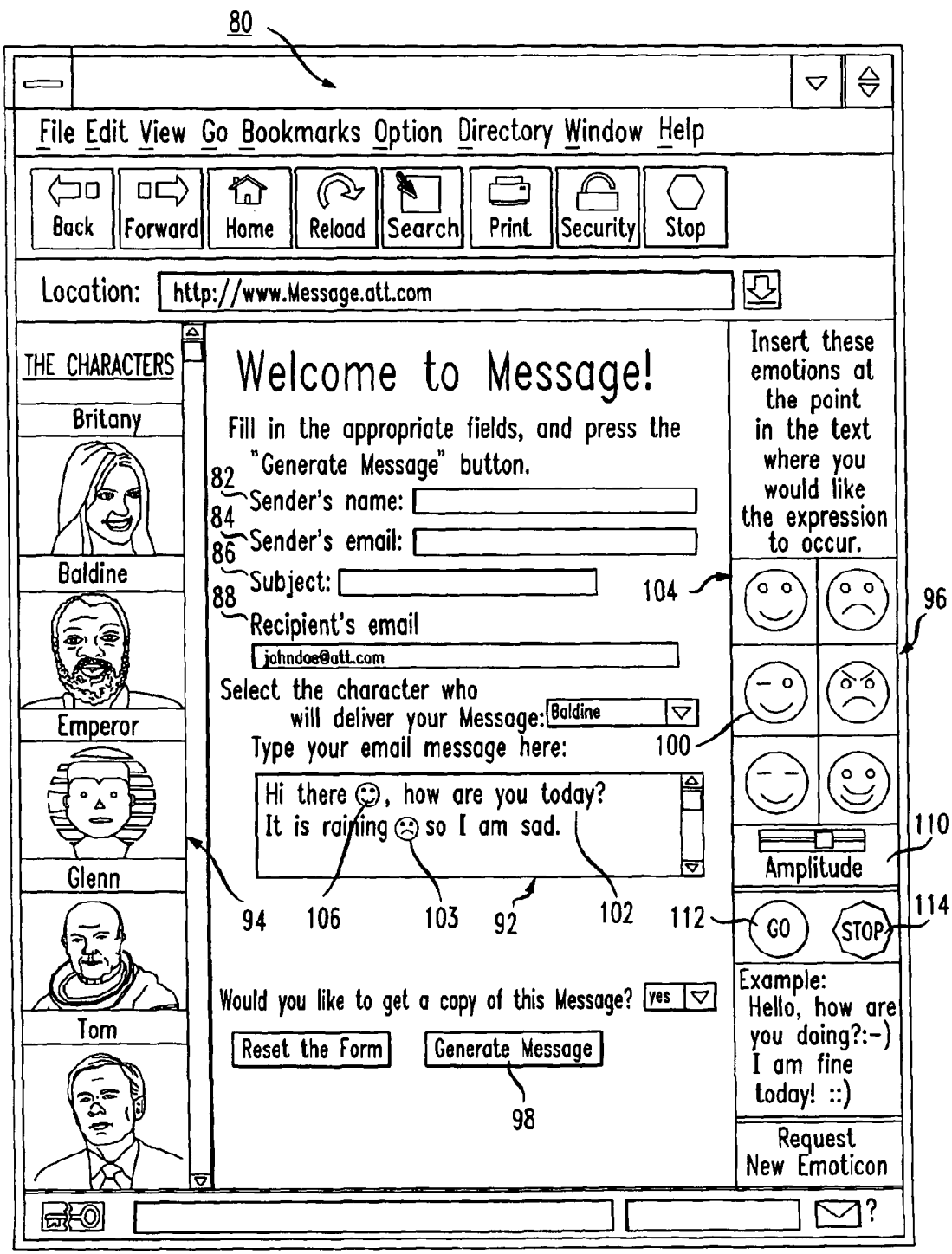
FIG. 6 shows an example of a dialogue page available to the sender for choosing emoticons for insertion into the text message.

FIG. 6 shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose (90) for delivering the message. Typically the animated entities are faces as shown in FIG. 6, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*w*" for an eye wink, and so forth. The predefined emoticons are represented either as icons or as text, such as ";-)". As shown in FIG. 6, the window 80 includes a sample group of emoticon icons 96. The sender inserts an emoticon into a text message at the location of the cursor 102 by clicking on one of the emoticon icons 100. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

The group of emoticons available for choosing can include a wink, smile, frown, surprise, affirmative animated entity motion, such as a nod of the head, eyes opening and staring, eyes popping out, eyes rolling, shoulder shrug, tongue motion, embarrassment, blushing, scream, tears, kiss and nose elongation. All varieties of facial expressions and emotions are contemplated as part of the present disclosure and the particular set of emoticons is unimportant to this invention.

FIG. 6 further illustrates an amplitude bar 110. The sender manipulates this bar to increase or decrease the amplitude of the expression associated with a particular emoticon. For example, the sender may highlight a smile emoticon 106 by clicking on the smile emoticon 104. While the inserted emoticon is highlighted in the text message in the window 92, the sender manipulates the amplitude bar 110 to increase or decrease the amplitude of the emoticon expression.

As the sender increases or decreases the amplitude of the inserted emoticon, the expression shown in the smile icon 106 may reflect the modified amplitude. For example, with a text emoticon in the message text (not shown), a smile that is increased in amplitude by the amplitude bar 110 becomes ":-)))". Here the repetition of the last symbol of the emoticon is used to control the amplitude of the emoticon. Generally, the emoticon/amplitude symbols may be defined as a prefix code. Similarly, an icon emoticon 103 may reflect an increased amplitude in its appearance. The increased intensity of the emoticon may be accomplished by changing the icon from a black-on-white background to black-on-colored background (such as red or yellow) where the intensity of the background color reflects the amplitude. The amplitude of an emoticon may also be changed by other means such as by clicking the right mouse button, or its equivalent, to increase the amplitude or by clicking on the left mouse button, or its equivalent, to decreases the amplitude. In this regard, the sender can control the intensity of the emotion expressed by the animated entity to the recipient.

Further as shown in FIG. 6, go button 112 and stop button 114 are also available to indicate start and stop locations for emoticons. A user may insert an emoticon into the text and then indicate using the go button 112 and stop button 114 when the effect of the emoticons should begin and end, respectively. In this regard, the amplitude bar 110 and go button 112 and stop button 114 provide the sender with additional control over the use of emoticons in multi-media messages.

Figure 7:
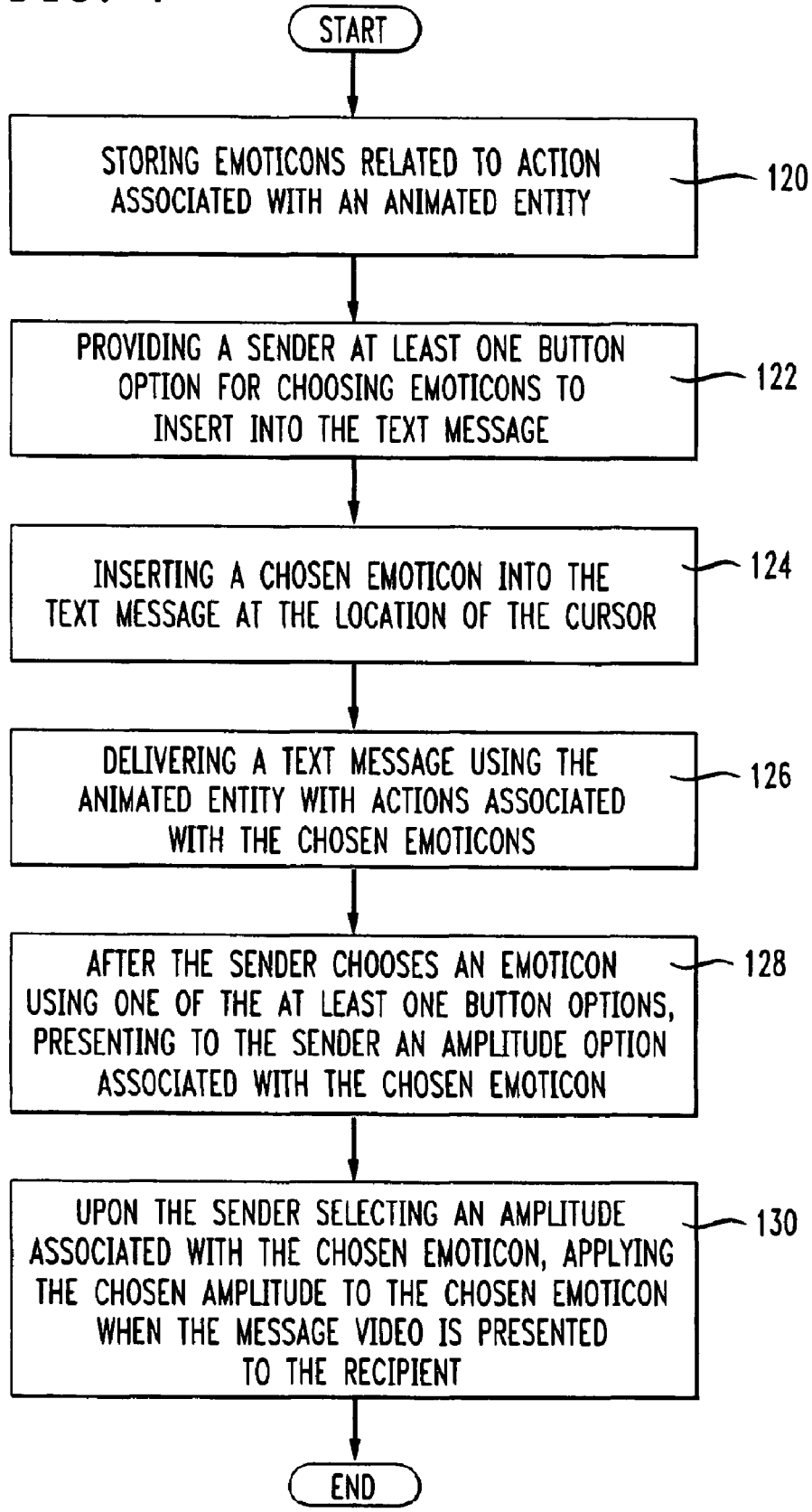
FIG. 7 illustrates another example of a method for delivering a multi-media message to a recipient using emoticons selected by the sender.

A method of delivering a multi-media message according to an embodiment of the present invention is shown by way of example in FIG. 7. The method relates to customizing a multi-media message with emoticons, the multi-media message being created by a sender for a recipient wherein the multi-media message comprises an animated entity audibly delivering a text message. The method comprises storing emoticons related to actions associated with the animated entity (120), providing to a sender at least one button option for choosing emoticons to insert into the text message at a location of a cursor (122), and upon the sender choosing an emoticon using one of the at least one button options, inserting an emoticon into the text message at the location of the cursor (124). When the animated entity delivers the text message, the animated entity exhibits the actions associated with the inserted emoticons (126). As mentioned above, the emoticons available for choosing by the sender may comprise a wink, a smile, an affirmative animated entity motion such as a nod of the head, eyes opening and staring, eyes popping out, eyes rolling, shoulder shrug, tongue motion, embarrassment, blushing, scream, tears, kiss and nose elongation.

In some cases, the animated entity may be unable to present the selected feature or selected emoticons with their level of amplitude adjustment. If this occurs, then the system may either ignore the chosen features or simply replace the chosen feature with a replacement feature using default parameters or parameters that are most related to the chosen feature.

The animated entity is preferably a face but via either predefined animated entities or via sender-customizable animated entities, the entity may be some other object for delivering the message. Preferably, when the emoticon is inserted into the text of the message, an icon representing the emoticon is inserted. An icon or some kind of visual representation of the smile, frown, wink, or whichever emoticon was chosen, will be more pleasing to view by the sender and recipient (if the recipient chooses to view the message text).

As shown in FIG. 7, the method further comprises, after the sender chooses an emoticon using one of the at least one button options, presenting to the sender an amplitude option associated with the chosen emoticon (128). Upon the sender selecting an amplitude associated with the chosen emoticon, applying the chosen amplitude to the chosen emoticon when the multi-media message is presented to the recipient (130). The amplitude bar 110 shown in FIG. 6 may be used to accomplish emoticon amplitude adjustment but other means as well are contemplated.

Figure 8:
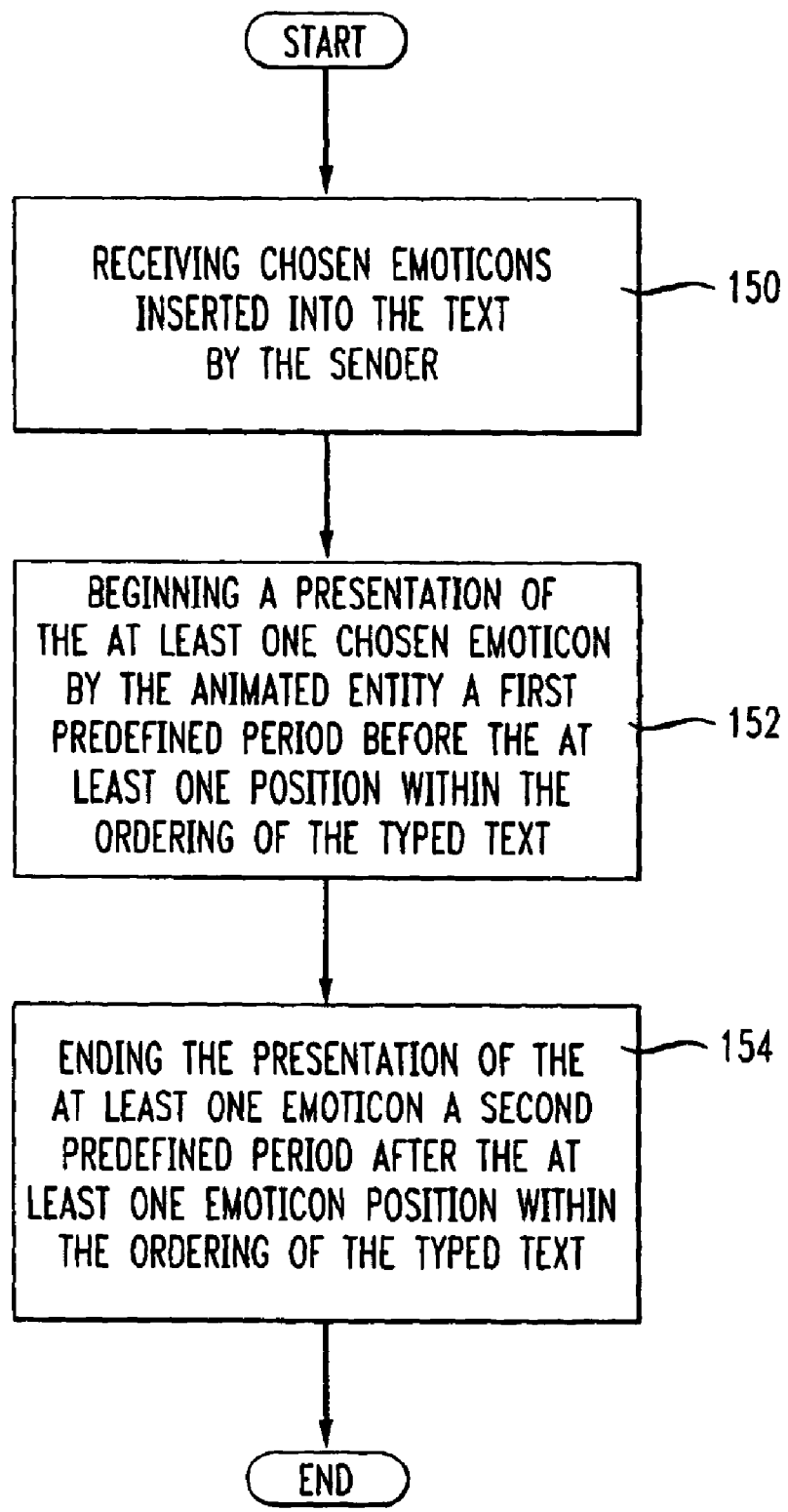
FIG. 8 illustrates another example of a method for delivering a multi-media message using sender-selected emoticons.

Another aspect of the present invention is illustrated in FIG. 8. This aspect of the invention relates to the starting and stopping time of the presentation of an emoticon as the animated entity delivers the multi-media message to the recipient. As noted above, according to the prior art, the animated entity stops talking and begins and ends the presentation of the emoticon (smile, for example), and then proceeds to finish the message. The method according to the present invention, and as shown in FIG. 8, is a method of presenting a multi-media message having an animated entity created by a sender including at least one chosen emoticon, the multi-media message being created by the sender where text typed by the sender is presented to a recipient using an animated entity in the multi-media message, the at least one emoticon being in a position associated with an ordering of the typed text. The emoticons are received by the system after being inserted by the sender (150). The method comprises beginning a presentation of the at least one chosen emoticon by the animated entity a first predefined period before the at least one emoticon position within the ordering of the typed text (152). The presentation of the emoticon ends a second predefined period after the at least one emoticon position within the ordering of the typed text (154). The predefined period may be either a predefined number of words or syllables before and after the emoticon or a predefined period of time before and after the emoticon.

For example, in the sentence "Hi there :-), how are you?" the face server 68 and TTS server 66 are programmed to begin the expression of the smile at the beginning of the word "there" and when the smile emoticon is presented in the text, the presentation of the smile will be at its peak. Then the smile will be reduced until it ends after "how". In this example, the predefined number of words is one. However, variations include choosing not just a predefined number of words but a predefined number of syllables or including an analysis of the length of the words before and after and determining how long before or after the position of the emoticon to start and stop its presentation. The time may also vary from emoticon to emoticon.

Similarly, the amount of time before the emoticon is to start its presentation or stop its presentation after the emoticon may also be context-driven by the length of words or position in the sentence. For example, the sentence "Hi there, how may I help you :-)?" may be context-driven to start the smile at "how" but then stop the smile immediately after ":-)" since the smile was placed at the end of a sentence.

In another variation of the present invention, the method comprises providing to the sender an option to associate at least one typed word to a chosen emoticon, wherein if the sender associates at least one typed word to a chosen emoticon, each at least one typed word associated with an emoticon is associated with the presentation by the animated entity of the chosen emoticon. In this manner, the sender can further modify and control the beginning, length and ending of an emoticon presentation. The sender can associate typed words with an emoticon by underlining, coloring, highlighting, or any other means. For example, the method may comprise providing the sender an option to assign a color to the at least one typed word such that the chosen emoticon begins to be presented by the animated entity to the recipient at the first typed word with the assigned color and the chosen emoticon presentation by the animated entity ends at the last typed word with the assigned color.

In this case, in a sentence such as "Hi John, :-) are you pleased that the stock market is up?" the underlining represents the highlighting wherein the sender chooses to begin the smile at the beginning of the word "are" and to continue the smile through the word "up". The method comprises receiving the indicated duration of the emotion and presenting the chosen duration of the emotion as the animated entity delivers the message. As mentioned above, the highlighting can occur through coloring words, underlining words, or some other means of presenting the emotion.

In another variation of the invention, providing the sender with options to highlight words to associate one or a group of words to a specific emoticon also enables the sender to include amplitude information for the presentation of the emoticon in the message. For example, the user may be given the option to underline a word or words more than once. The more times the word or words are underlined, the greater the amplitude of the presented emotion.

In yet another variation of the invention, the method enables the sender to insert start and stop signs for indicating starting and stopping points for the presentation of emotions by the animated entity. The starting and stopping points may be inserted via text or via icons. Referring momentarily to FIG. 6, this figure illustrates a start icon (such as a green light) 112 and a stop icon (such as a stop sign) 114 that may be used. The sender uses these starting and stopping signs by inserting a start sign 112 and then an emoticon, and then a stop sign 114. The start sign and stop sign will be associated with the emoticon inserted therebetween. When these tags are used, the method comprises delivering the multi-media message to the recipient using the animated entity wherein the animated entity starts the emoticon at the start sign and stops the emoticon at the stop sign.

To insure that the proper emoticon is associated with the intended start and stop signs, the web server 63 may include software instructing the server, before delivering the multimedia message to the recipient, to check the consistency with the start sign and stop sign inserted into the message text by the sender. If consistency exists with the start sign and the stop sign, wherein a single emoticon is inserted between them, the message is delivered to the recipient.

In yet another variation of the invention, the method relates to customizing a multi-media message by choosing features from a group of stored features, the multi-media message being created by a sender where text typed by the sender is presented to a recipient using an animated entity in the multi-media message. The method comprises providing to the sender at least one button option, each button option of the at least one button option associated with a feature to add to the animated entity. Upon the user choosing a feature using one of the at least one button options, the chosen feature is inserted into the text of the message, wherein as the multi-media message is delivered to the recipient, the chosen feature is presented in a visual and audible manner by the animated entity. A sample group of stored features comprises an eye color feature, a mouth protrusion feature, a skinniness feature, a fat feature and an age feature. Other features are contemplated for adjusting the features of the animated entity. Although the above description may contain specific details, they should not be construed as limiting the claims in any way. Other configurations of the described embodiments of the invention are part of the scope of this invention. For example, the present disclosure is presented in the context of delivering e-mails. However, the present invention may be applied in any communication context where an animated entity can deliver a message created from text. For example, instant messaging technology may include an option to type a message and have the message delivered by an animated face. Accordingly, the present invention may be applied in a variety of contexts. Accordingly, the appended claims and their legal equivalents should only define the invention, rather than any specific examples given.

We claim:

1. A method of presenting a multi-media message having an animated entity created by a sender including a chosen emoticon from a plurality of emoticons, the multi-media message being created by the sender where text typed by the sender is presented to a recipient using an animated entity in the multi-media message, the chosen emoticon being in a position within the typed text, the method comprising:

via a processor, beginning an animation of the animated entity according to the chosen emoticon at a first time which is a first predetermined time before a second time associated with the position of the chosen emoticon within the typed text; and ending the animation of the animated entity according to the chosen emoticon at a third time which is a second predetermined time after the second time, wherein the first time and the third time are based at least in part on one of the position of the chosen emoticon within the typed text and the chosen emoticon.

2. The method of claim 1, wherein the chosen emoticon comprises one of a wink, a smile, an affirmative animated entity motion, eyes opening and staring, eyes popping out, or a nose elongation.

3. The method of claim 1, wherein the chosen emoticon comprises one of a surprise, a frown, eyes rolling, a shoulder shrug, a tongue motion, embarrassment, blushing, a scream, tears or a kiss.

4. The method of claim 1, wherein the animated entity is a face.

5. The method of claim 1, further comprising:
applying an amplitude chosen by the sender to the chosen emoticon when the multi-media message is presented to the recipient.

6. The method of claim 1, wherein the position of the chosen emoticon within the typed text is chosen by the sender.

7. A non-transitory machine-readable storage medium having recorded thereon instructions for controlling at least one processor to present a multi-media message created by a sender, the machine-readable medium comprising:
instructions for beginning an animation of an animated entity according to a chosen emoticon at a first predefined time before a second predetermined time associated with a position of the chosen emoticon within an ordering of typed text; and
instructions for ending the animation of the animated entity according to the chosen emoticon at a third predefined time after the second predefined time, wherein the first predefined time and the third predefined time are based at least in part on one of the position of the chosen emoticon within the typed text and the chosen emoticon.

8. The machine-readable medium of claim 7, wherein the chosen emoticon comprises one of a wink, a smile, an affirmative animated entity motion, eyes opening and staring, eyes popping out, or a nose elongation.

9. The machine-readable medium of claim 7, wherein the chosen emoticon comprises one of a surprise, a frown, eyes rolling, a shoulder shrug, a tongue motion, embarrassment, blushing, a scream, tears or a kiss.

10. The machine-readable medium of claim 7, wherein the animated entity is a face.

11. The machine-readable medium of claim 7, further comprising:
instructions for applying an amplitude chose by the sender to the chosen emoticon when the multi-media message is presented to a recipient.

12. A system comprising:
at least one server configured to receive a multi-media message created by a sender at a first client device, the multi-media message including a chosen emoticon selected by the sender and an animated entity chosen by the sender, wherein the at least one server is further configured to:
create a multi-media presentation corresponding to the received multi-media presentation; and
stream the multi-media presentation to a second client device, the multi-media presentation including:
beginning an animation of the animated entity according to the chosen emoticon at a first predefined time which is before a second predetermined time associated with a position of the chosen emoticon within a typed text of the multi-media message; and
ending the animation of the animated entity according to the chosen emoticon at a third predefined time after the second predetermined time, wherein the first predefined time and the third predefined time are determined with at least one of the position of the chosen emoticon within the text and the chosen emoticon.

13. The system of claim 12, wherein the chosen emoticon comprises one of a wink, a smile, an affirmative animated entity motion, eyes opening and staring, eye popping out, or a nose elongation.

14. The system of claim 12, wherein the chosen emoticon comprises one of a surprise, a frown, eyes rolling, a shoulder shrug, a tongue motion, embarrassment, blushing, a scream, tears or a kiss.

15. The system of claim 12, wherein the animated entity is a face.

16. The system of claim 12, wherein when the at least one server creates the multi-media presentation, the at least one server is further configured to apply an amplitude chosen by the sender to the chosen emoticon.

* * * * *